(12) United States Patent
Lai et al.

(10) Patent No.: US 6,298,185 B1
(45) Date of Patent: Oct. 2, 2001

(54) DISTRIBUTED FIBER GRATING SENSING SYSTEMS USING BIREFRINGENCE FIBER INTERFEROMETERS FOR DETECTING WAVELENGTH SHIFTS

(75) Inventors: Yinchieh Lai, Taichung; Yuh-Wen Chen, Taichung Hsien; Ching-Long Ong, Taichung; Ben Hong, Taipei-Hsien; Jiam-Hwa Lee; Rwei-Ping Ma, both of Taichung; Shih-Chu Wu, Tainan; Ming-Yang Tsai; Cheng-Ching Lee, both of Taichung Hsien, all of (TW)

(73) Assignee: Chung-Shan Institute of Science and Technology

( * ) Notice: Subject to any disclaimer, the term of this patent is extended or adjusted under 35 U.S.C. 154(b) by 0 days.

(21) Appl. No.: 09/400,829

(22) Filed: Sep. 21, 1999

(51) Int. Cl.$^7$ ........................................................ G02B 6/34
(52) U.S. Cl. ................................................ 385/37; 385/12
(58) Field of Search .................................... 385/37, 12, 42; 359/124, 130; 356/345, 477, 478; 250/227.19, 227.27

(56) References Cited

U.S. PATENT DOCUMENTS 5,627,927 * 5/1997 Udd ........................................ 385/37
6,208,454 * 3/2001 Koren et al. ........................ 359/326

* cited by examiner

Primary Examiner—Georgia Epps
Assistant Examiner—John J. Magee
(74) Attorney, Agent, or Firm—Rosenberg, Klein & Lee

(57) ABSTRACT

A distributed fiber-grating-based sensing system, the system comprises one or more scanned birefringence fiber interferometers to detect the small wavelength shift of the light reflected from the fiber grating, a wavelength demultiplexer to separate the lights from each fiber grating, a reference fiber grating for determining the absolute optical wavelengths. Compared with the prior art, the system has advantages of easier fabrication, better stabilization, and can be customized for different applications.

2 Claims, 5 Drawing Sheets

DISTRIBUTED FIBER GRATING SENSING SYSTEMS USING BIREFRINGENCE FIBER INTERFEROMETERS FOR DETECTING WAVELENGTH SHIFTS

BACKGROUND OF THE INVENTION

1. Field of Invention

The present invention generally relates to fiber-grating-based sensing systems, and more particularly to a distributed fiber-grating-based sensing system capable of accurately measuring wavelengths.

2. Description of Related Art

Fiber Bragg gratings have been used to detect variations of physical parameters, such as temperature or strain, from where the fiber gratings are located due to the fact that changes in the environmental parameters generally result in changes of center wavelength of the light reflected from the fiber Bragg gratings. By measuring the center wavelength of the reflected light from the fiber gratings, the environment parameters can be determined.

One of the most frequently-used methods to detect the center wavelength of the reflected light from the fiber gratings is to provide a broadband light source or a tunable laser beam incident to a fiber grating, and measure optical characteristics such as the center wavelength, intensity, and time delay of the narrow-band light reflected from the fiber grating. If multiple fiber gratings are used, a distributed multiple-points detection can be achieved by detecting reflected lights with different wavelength from different fiber gratings.

To detect a center wavelength of the narrow-band light reflected from the fiber gratings, there are mainly three approaches: (1). Using unbalanced Mach-Zehnder interferometer. (2). Using tunable Fabry-Perot filter. (3). Using fiber grating elements. The first two approaches require a reference light source to ascertain the absolute optical wavelength, due to the fact that both the Mach-Zehnder interferometer and tunable Fabry-Perot filter are susceptible to environmental changes and can easily result in wavelength shifts while measuring. The reference light source can be temperature-compensated fiber gratings or fixed Fabry-Perot filters.

Conventional fiber-grating-based sensing systems can be constructed by applying the above-mentioned technologies, which are shown in FIG. 1 and FIG. 2. Unfortunately, there are disadvantages found in the systems shown in FIGS. 1 and 2. (1). The tunable Fabry-Perot filters are quite expensive and scanning speed is not fast enough. (2). Integrated optics unbalanced Mach-Zehnder interferometers are too expensive, while fiber unbalanced Mach-Zehnder interferometers have problems accurately controlling the difference of the optical path between two branches. Furthermore, they are difficult to fabricate, and the random shift of the phase difference is significant. (3). There is a problem of wavelength ambiguity by using the Mach-Zehnder interferometer to detect multiple fiber gratings.

SUMMARY OF THE INVENTION

It is therefore an objective of the present invention to provide a distributed fiber-grating-based sensing system for detecting wavelength shifts, which can be easily fabricated, and is highly stable and sensitive. The system comprises a broadband light source, a plurality of fiber grating sensors, one or multiple scanned birefringence fiber interferometers, a wavelength demultiplexer, a reference fiber grating, and a signal processing means. The scanned birefringence fiber interferometer is used to detect the small wavelength shift of the light reflected from the fiber grating. The wavelength demultiplexer is used to separate the lights from each fiber grating. The reference fiber grating is used to determine the absolute optical wavelengths. Compared with the prior art, the system of the present invention has advantages of easier fabrication, better stabilization, and can be customized for different applications.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
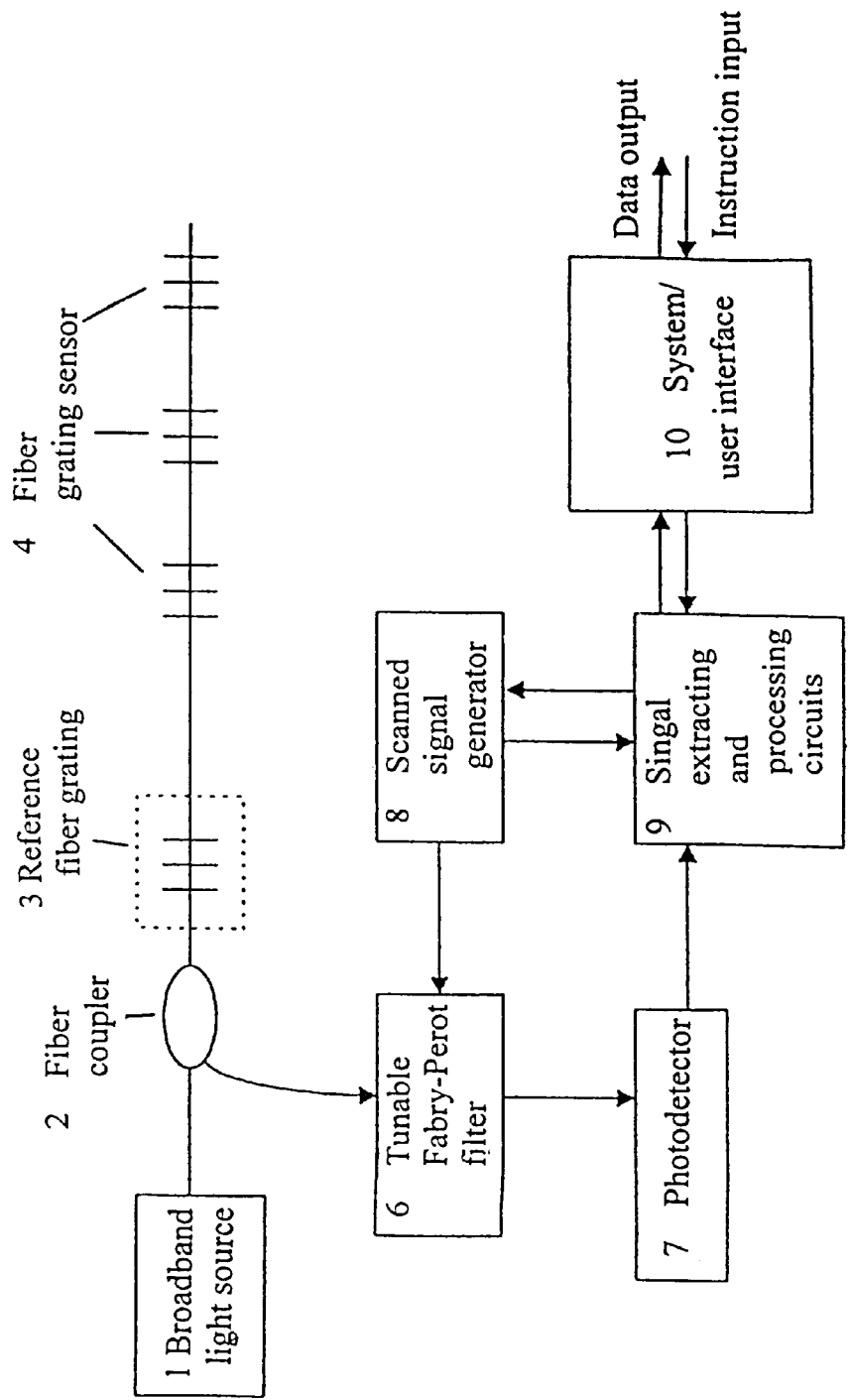
FIG. 1 is a schematic block diagram of a conventional fiber grating sensing system using a tunable Fabry-Perot filter.

Reference will now be made in detail to the present preferred embodiments of the invention, examples of which are illustrated in the accompanying drawings. Wherever possible, the same reference numbers are used in the drawings and the description to refer to the same or like parts.

Figure 3:
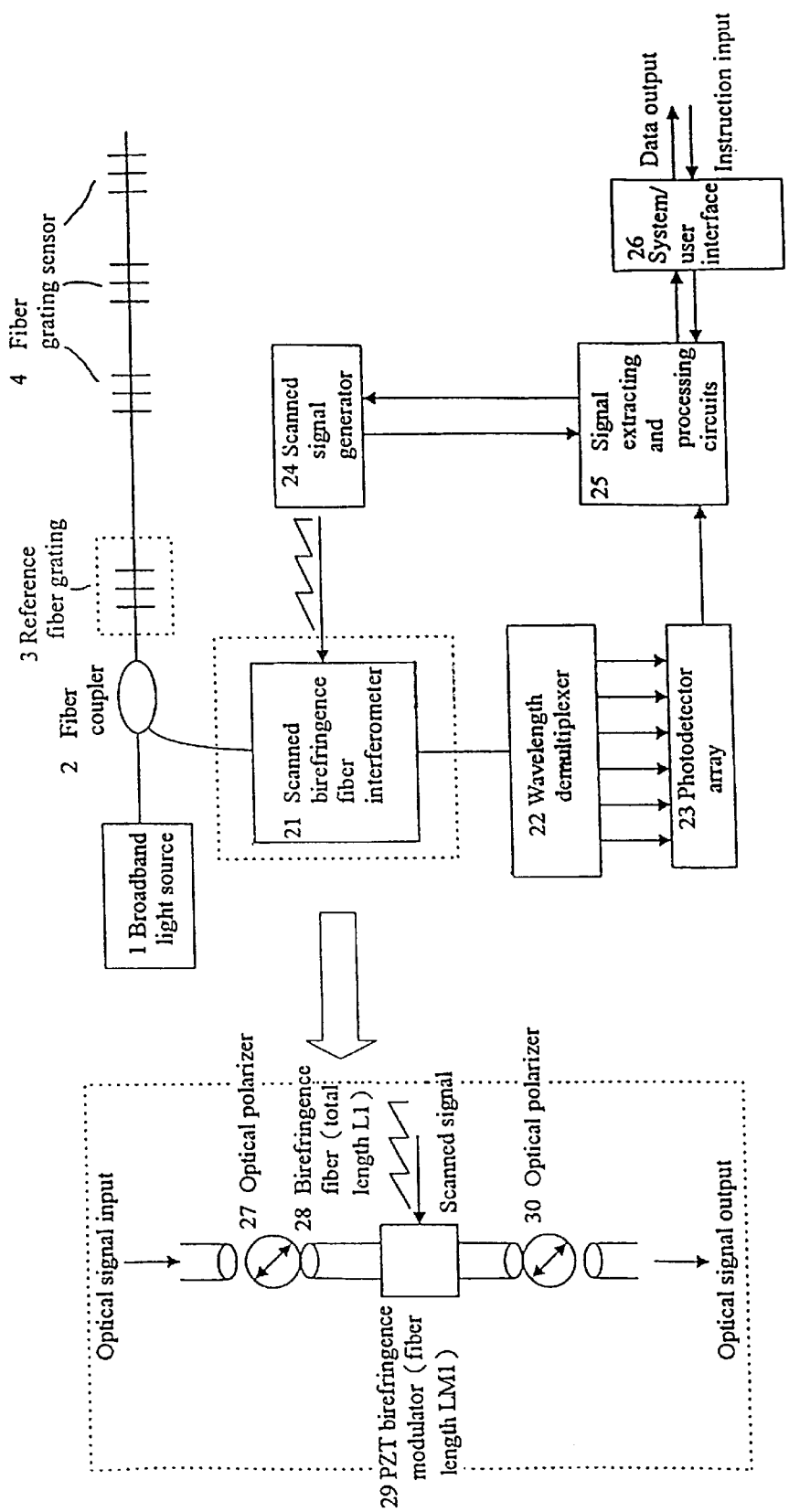
FIG. 3 is a schematic block diagram of a distributed fiber-grating-based sensing system using a scanned birefringence fiber interferometer according to a preferred embodiment of the present invention.

Refer to FIG. 3, which shows a schematic block diagram of a distributed fiber-grating-based sensing system using a scanned birefringence fiber interferometer according to a preferred embodiment of the present invention. As shown in FIG. 3, a broadband light source 1, for example, a light emitting diode (LED) or a Erbium-doped fiber broadband light source, provides broadband light incident to an array of serially coupled fiber grating sensors 4. The broadband light passes through a fiber coupler 2 to irradiate a reference fiber grating 3 and the fiber grating sensor array 4, generating a plurality of narrow-band reflected lights of different frequency. A portion of the reflected lights pass through the fiber coupler 2 and are incident to a scanned birefringence fiber interferometer 21. The scanned birefringence fiber interferometer 21 comprises an optical polarizer 27, a birefringence fiber 28, a PZT birefringence modulator 29, and an optical polarizer 30. An angle of 45 degrees between the polarization direction of the optical polarizers 27, 30 and the optical axis of the birefringence fiber 28 must be maintained. The birefringence fiber 28 has a total length of L1, of which a length of L2 is tightly wrapped on the PZT birefringence modulator 29. Consequently, when the PZT birefringence modulator 29 is driven by an externally applied signal to oscillate, the birefringence characteristics of the birefringence fiber 28 also change. The output light signal from the scanned birefringence fiber interferometer 21 keeps irradiating and is incident to a wavelength demultiplexer 22, which separates reflected lights from different fiber gratings, and subsequently detected by a photodetector array 23. Outputs from the photodetector array 23, which are modulated by the scanned birefringence fiber interferometer 21, correspond to the reflected lights from the different fiber gratings. By detecting phases of the output signals from the photodetector array 23, the center wavelength of the lights reflected from different fiber gratings can be determined. For a sufficiently narrow band reflected light, the transmission coefficient of the scanned birefringence fiber interferometer 21 is determined by Eq.(1) below.

$$T = \cos^2\left[\frac{2\pi \Delta nfL_1}{c} + \phi(t)\right] \quad (1)$$

where c is the optical velocity, f is the frequency, $\Delta n$ is the difference of the refractive coefficients from two polarization directions of the birefringence fiber 28 when the modulated signal is not applied, $L_1$ is the length of the birefringence fiber 28, $\phi(t)$ is the phase difference from two polarization directions when the modulated signal is applied to the birefringence modulator 29, If the modulated signal applied to the PZT birefringence modulator 29 is a sawtoothed wave, then $\phi(t)$ is a linear function of t when scanning.

$$\phi(t) = K_1 t \quad (2)$$

where proportional coefficient $K_1$ is proportional to the total fiber length LM1 and the magnitude of the externally applied modulated signal. To this end, frequency f can be determined by measuring the phase at the frequency $2K_1$.

From Eq.(1), it is understood that the interference frequency interval of the birefringence interferometer when the modulated signal is not applied is:

$$\Delta f = \frac{c}{\Delta n L_1} \quad (3)$$

Figure 2:
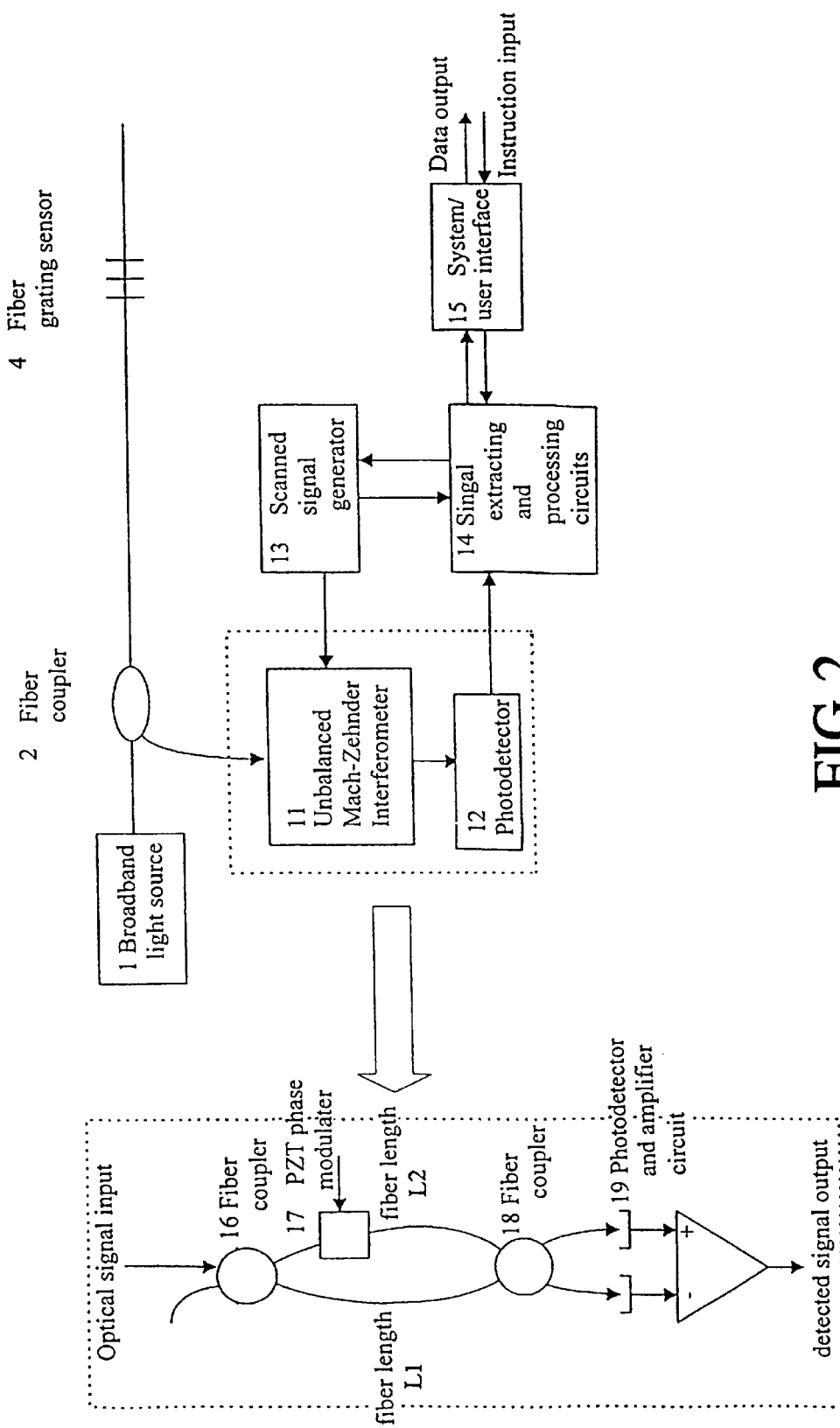
FIG. 2 is a schematic block diagram of a conventional fiber grating sensing system using an unbalanced Mach-Zehnder interferometer.

Therefore, the interference frequency interval of the birefringence interferometer can be set by adjusting $L_1$. Generally, birefringence fiber has a $\Delta n$ up to about 0.0005. If the fiber has a length of 6 meters, then the frequency interval becomes 100 GHz, which is about 0.8 nm in terms of wavelength interval. For the unbalanced fiber Mach-Zehnder interferometer shown in FIG. 2, the interference frequency interval can be calculated by Eq.(4) below.

$$\Delta f = \frac{c}{n |L_2 - L_1|} \quad (4)$$

where n is the equivalent refractive coefficient of the fiber (n=1.5).

It is understood that if the Mach-Zehnder interferometer is used to obtain a 200 GHz frequency interval, then the difference of the fiber length between the two branches needs to be 2 mm. Therefore, it is much easier to control the birefringence fiber interferometer than the unbalanced fiber Mach-Zehnder interferometer from the fabrication point of view. This is one of the advantages of the present invention. Another advantage of using the birefringence fiber interferometer is that two lights within the birefringence fiber interferometer pass through the same fiber. Therefore, the birefringence fiber interferometer is much more stable than the unbalanced fiber Mach-Zehnder interferometer.

Figure 5:
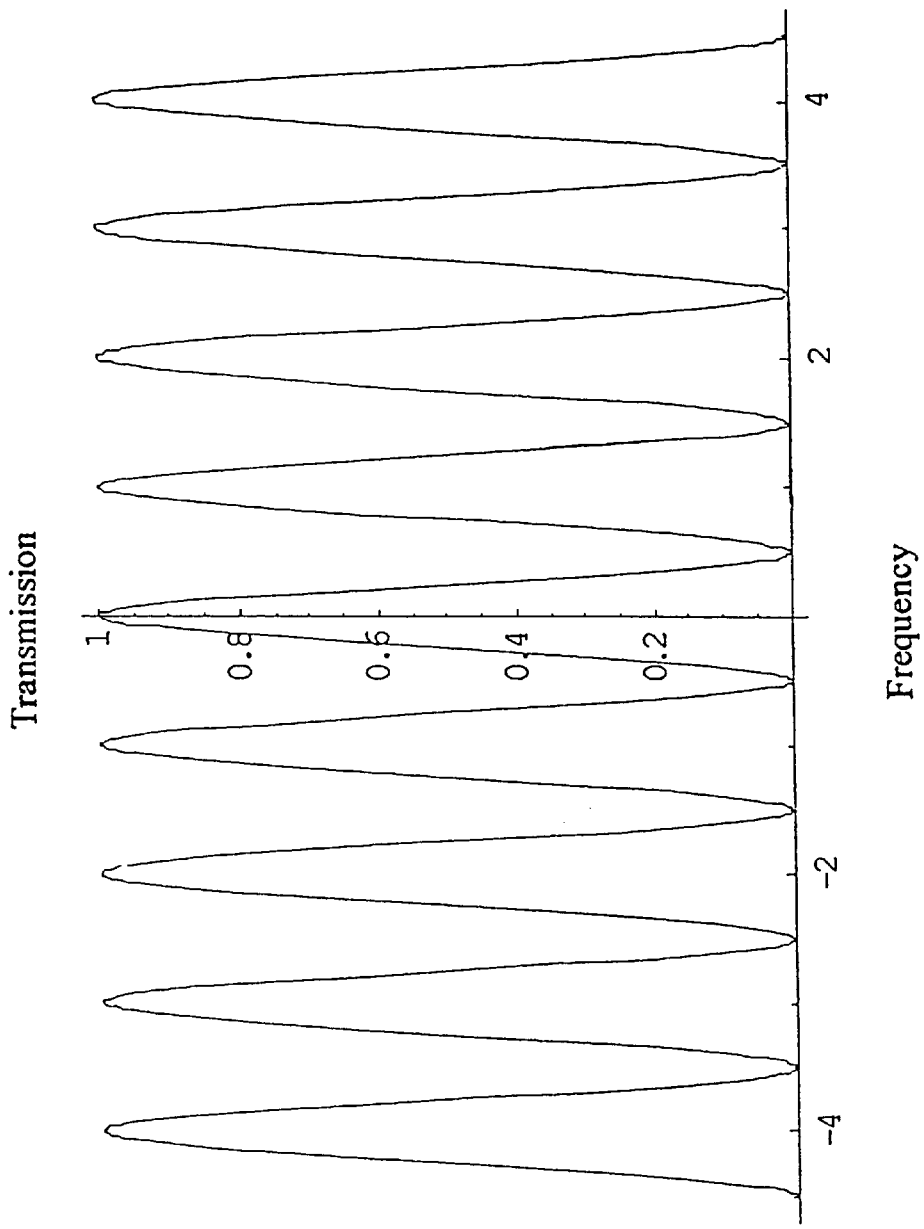
FIG. 5 is a diagram showing the transmission spectrum of the interferometer.

Note that the transmission spectrum of the interferometer as shown in FIG. 5 is a periodic function, which results in an ambiguity in determining the wavelength. To solve this problem of wavelength ambiguity, a wavelength demultiplexer is used to approximately determine the wavelength. Subsequently, the modulated signal is applied to the interferometer so that the wavelength of reflected lights can be accurately determined. As long as the frequency interval of the wavelength demultiplexer is less than that of the interferometer, the problem of wavelength ambiguity generally does not exist. Currently, the wavelength demultiplexers used in optical communication generally have a frequency interval of 100 GHz or lower, which is sufficient to be used with the interferometer.

Note that the transmission spectrum of the interferometer is a sinusoidal function as shown in FIG. 5, which implies that the larger the frequency interval, the lower the measuring sensitivity will be. Therefore, when a higher measuring sensitivity is required, the frequency interval can not be too large, which significantly limits the operation range without wavelength ambiguity.

Figure 4:
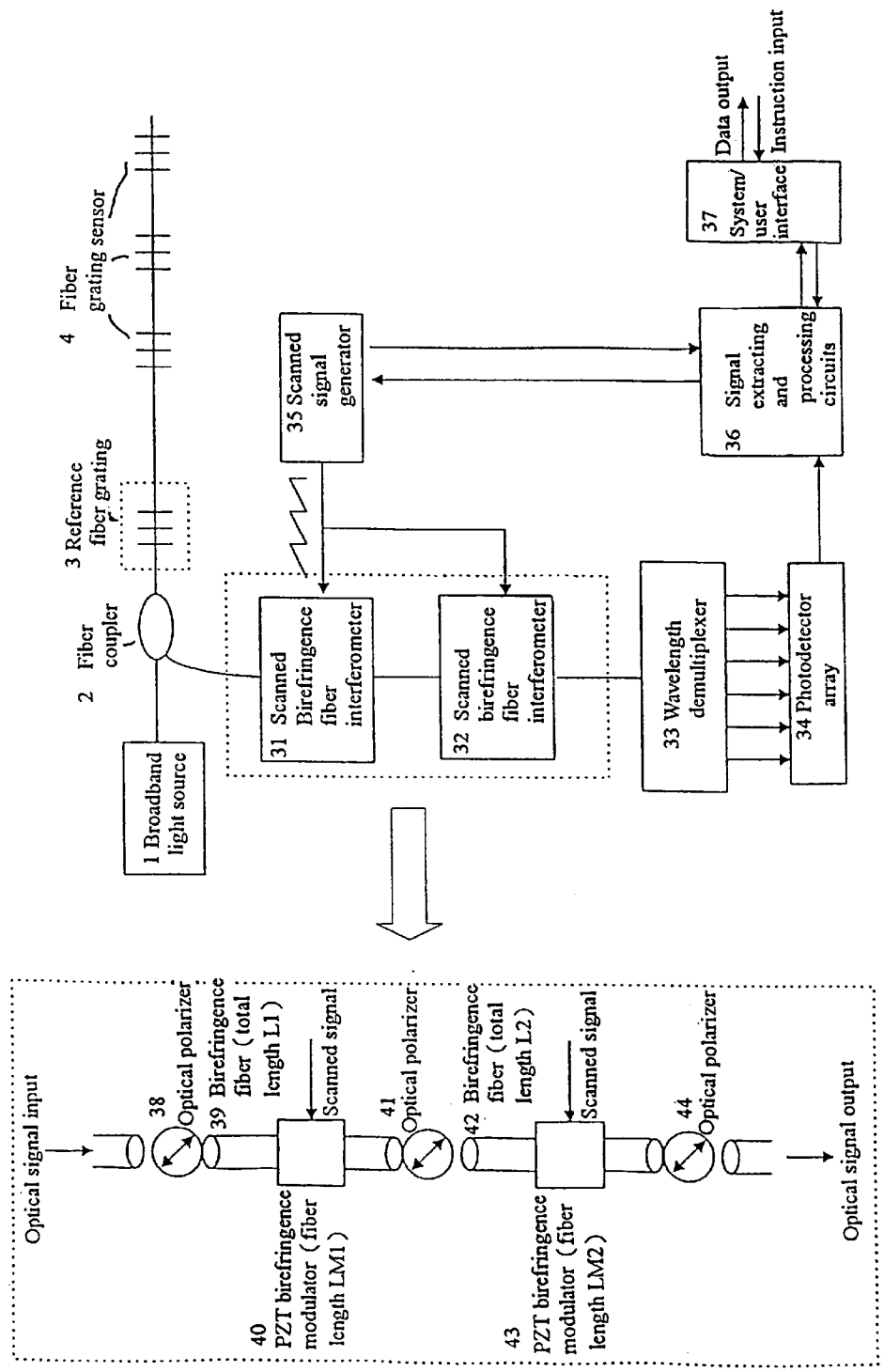
FIG. 4 is a schematic block diagram of a distributed fiber-grating-based sensing system using two scanned birefringence fiber interferometers according to another preferred embodiment of the present invention.

Although the problem of wavelength ambiguity can be overcome by using wavelength demultiplexers having a smaller frequency interval, it is more expensive, however. To satisfy the requirements to maintain a high measuring sensitivity as well as to maintain an operation range of 5 nm without wavelength ambiguity, an architecture of the distributed fiber-grating-based sensing system according to another preferred embodiment of the present invention is shown in FIG. 4. By cascading two scanned birefringence fiber interferometers having different fiber lengths as shown in FIG. 4, the operation range without wavelength ambiguity as well as measuring sensitivity can be increased. The designing principles of FIG. 4 can be described as follows:

Assume that the input scanned signal is a saw-toothed wave, the transmission coefficient of the first birefringence fiber interferometer during the scanning process is:

$$T_1 = \cos^2\left[K_1 t + \frac{2\pi \Delta nfL_1}{c}\right]$$

, and the transmission coefficient of the second birefringence fiber interferometer during the scanning process is $$T_2 = \cos^2\left[K_2 t + \frac{2\pi \Delta nfL_2}{c}\right]$$

The overall transmission coefficient is the product of T1 and T2, $$T = T_1 T_2 = \frac{1 + \cos[2(K_1 t + \phi_1)] + \cos[2(K_2 t + \phi_2)]}{4} + \frac{\cos[2(K_1 - K_2)t + 2(\phi_1 - \phi_2)] + \cos[2(K_1 + K_2)t + 2(\phi_1 + \phi_2)]}{8} \quad (5)$$

where $$\phi_1 = 2\pi \Delta nfL_1/c, \quad \phi_2 = 2\pi \Delta nfL_2/c$$

Therefore, the operation range without wavelength ambiguity can be increased by measuring the phase at frequency component ($K_1-K_2$); the measuring sensitivity can be increased by measuring the phase at frequency component ($K_1+K_2$), respectively.

In a practical system, parameters like $L_1$, $L_2$, $\Delta n$, are generally not precisely known. Thus, a reference light source needs to be used for calibration purpose to obtain the absolute optical wavelength. In FIGS. 3 and 4, a temperature-compensated fiber grating is used to provide the reference light source. The temperature-compensated fiber grating has a temperature coefficient close to 1 pm/degree at center wavelength, which is sufficient for most practical applications. Of course, multiple reference fiber gratings or a fixed Fabry-Perot resonator can also be used for calibration purposes. Also, optical switches are generally used to avoid conflicts with the sensing signals.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A distributed fiber-grating-based sensing system for detecting small wavelength shifts, the distributed fiber-grating-based sensing system comprising:

a broadband light source;

a plurality of sensors coupled to the broadband light source to receive a broadband light signal, wherein the sensors generates narrow band reflected signals upon the receiving of the broadband light signal, wherein wavelengths of the reflected signals change when environmental parameters around the sensors change;

a reference light source coupled to the broadband light source and the sensors for providing an optical signal of fixed wavelength;

a scanned birefringence fiber interferometer, wherein the scanned birefringence fiber interferometer receives the narrow band reflected signals from the sensors to generate modulated light signals;

a wavelength demultiplexer coupled to the scanned birefringence fiber interferometer to separate the modulated light signals having different wavelengths;

a photodetector array to detect the modulated signals separated by wavelengths from the wavelength demultiplexer; and a signal processing means coupled to the photodetector array, wherein the signal processing means calculates wavelengths of the narrow band reflected signals from the sensors based on signals received from the photodetector array.

2. A distributed fiber-grating-based sensing system for detecting small wavelength shifts, the distributed fiber-grating-based sensing system comprising:

a broadband light source;

a plurality of sensors coupled to the broadband light source to receive a broadband light signal, wherein the sensors generates narrow band reflected signals upon the receiving of the broadband light signal, wherein wavelengths of the reflected signals change when environmental parameters around the sensors change;

a reference light source coupled to the broadband light source and the sensors for providing an optical signal of fixed wavelength;

at least two scanned birefringence fiber interferometers in cascade, wherein the scanned birefringence fiber interferometers receive the narrow band reflected signals from the sensors to generate modulated light signals;

a wavelength demultiplexer coupled to the scanned birefringence fiber interferometer to separate the modulated light signals having different wavelengths;

a photodetector array to detect the modulated signals separated by wavelengths from the wavelength demultiplexer; and a signal processing means coupled to the photodetector array, wherein the signal processing means calculates wavelengths of the narrow band reflected signals from the sensors based on signals received from the photodetector array.

\* \* \* \* \*